(12) United States Patent
Baird (10) Patent No.: US 6,471,040 B1
(45) Date of Patent: Oct. 29, 2002

(54) VIBRATORY FEEDER EMBODYING SELF-CONTAINED CONTROL

(75) Inventor: Randy K. Baird, Bolivar, PA (US)

(73) Assignee: FMC Technologies, Inc., Chicago, IL (US)

( * ) Notice: Subject to any disclaimer, the term of this patent is extended or adjusted under 35 U.S.C. 154(b) by 69 days.

(21) Appl. No.: 09/654,475

(22) Filed: Sep. 1, 2000

(51) Int. Cl.⁷ ............................ G01V 9/04; B65G 25/00
(52) U.S. Cl. ................... 198/609; 198/752.1; 198/762
(58) Field of Search ........................... 198/762, 752.1, 198/609

(56) References Cited

U.S. PATENT DOCUMENTS

| | | | |
|---|---|---|---|
| 4,456,822 A | | 6/1984 | Rose et al. |
| 4,811,835 A | * | 3/1989 | Bullivant ................... 198/762 |
| 5,074,403 A | * | 12/1991 | Myhre ........................ 198/751 |
| 5,080,218 A | * | 1/1992 | Izume et al. ............... 198/751 |
| 5,145,054 A | | 9/1992 | Nelson |
| 5,777,232 A | | 7/1998 | Kurita et al. |
| 5,865,297 A | | 2/1999 | Chiba et al. |
| 5,872,478 A | | 2/1999 | Pounds |
| 5,883,478 A | * | 3/1999 | Thesling .................... 318/119 |
| 5,943,231 A | * | 8/1999 | Thomas ...................... 364/184 |
| 5,967,294 A | | 10/1999 | Patterson et al. |

OTHER PUBLICATIONS

FMC Corporation, Syntron® Light–Capacity Electromagnetic Vibrating Feeders, 1998, Form No. 109A3983, FMC Corp., USA.

\* cited by examiner

*Primary Examiner*—Donald P. Walsh
*Assistant Examiner*—Kenneth W Bower
(74) *Attorney, Agent, or Firm*—Wood, Phillips, Katz, Clark & Mortimer (57) ABSTRACT

A vibratory conveying feeder, which includes a power control circuit for locally providing an adjusted drive signal to the vibratory drive. Inclusion of a power control circuit into one or more vibratory conveying feeders within a system including multiple vibratory conveying feeders, enable the feeders to share a common power supply bus. By enabling multiple feeders to share a common power supply bus, the wiring associated with providing power connections to the multiple vibratory conveying feeders is correspondingly reduced. Consequently, initial system installation or system reconfiguration is greatly simplified.

20 Claims, 4 Drawing Sheets

VIBRATORY FEEDER EMBODYING SELF-CONTAINED CONTROL

FIELD OF THE INVENTION

The present invention relates to vibratory feeders and particularly to a vibratory feeder for conveying materials, which has a self-contained power control circuit.

BACKGROUND OF THE INVENTION

Vibratory feeders have been widely used in controlling the bulk delivery of various types of product including materials for use in feeding, mixing, grinding and packaging. Generally, the vibratory feeders are comprised of two elements, commonly referred to as two masses, which are vibrated with respect to one another. The first element is generally referred to as a base, and the second element is generally referred to as a trough. Located between the two elements is a vibratory drive, which vibrates the trough with respect to the base. As the trough is vibrated with respect to the base, the material located in the trough is conveyed or thrown forward at a predetermined rate, the rate being determined by the frequency, the force, and the angle of the vibrations.

The trough, is generally disposed above the base and is connected to the base by a system of springs. The springs are connected to the trough and base on an angle. A vibratory drive is mounted to the base and operatively coupled to the trough, so as to impart vibrations to the trough with respect to the base. At least one example of a vibratory drive includes an armature of an electromagnet, which is connected to one of the base or trough, usually the trough, and an electromagnet core and coil, which is connected to the other.

The feeder as a whole, generally rests upon a support structure. The base of the feeder, while resting upon the support structure, is generally vibrationally isolated from the support structure by one or more coil springs, or elastomer springs to minimize unwanted forces from being transmitted into the support, and surrounding structures.

When an electric current is caused to flow through the magnet, the armature and magnet pole faces are mutually attracted to each other, causing the springs to deflect, and the trough to be displaced with respect to the base, and relative to their rest positions. When the current is removed, the magnet releases the armature and the energy stored in the spring system causes the trough to move back toward its rest position. The movement of the trough generally continues through the rest position to a deflected position in the opposite direction, where the movement of the trough with respect to the base once again changes direction, back toward the rest position. As current is reapplied and removed, the process is repeated. If the current is turned on and off at a uniform rate, the trough and base will generally vibrate with respect to one another at a similar rate, or frequency.

In at least one type of vibratory feeder, the vibratory feeders are operated at a frequency determined by the power line frequency, or at twice the power line frequency where a diode rectifier is used, or a permanent magnet is used as part of the electromagnetic vibratory drive system. Examples of such feeders are manufactured by FMC Corporation of Homer City, Pa., under the trade name SYN-TRON. In such feeders, the frequency is fixed at 120 Hz or 60 Hz in North America, and 100 Hz or 50 Hz (usually 50 Hz) in most other countries of Europe or Asia. Since the frequency at which these feeders operate is generally fixed, only the stroke and stroke angle can typically be adjusted to optimize the feed rate. The stroke angle is largely dependent upon the construction and the orientation of the parts with respect to one another. Once the specific construction of the vibratory feeder has been determined, the stroke angle for that particular model becomes relatively fixed. Consequently, only the stroke magnitude remains as a parameter, which can be adjusted for adjusting the feeder's performance. Even still, the stroke magnitude of these feeders is constrained by the amount of magnetic force available to deflect the spring system, and ultimately by the stress limitations of the spring system and the other structural elements of the feeder.

The vibrational feeders generally attempt to take advantage of the natural amplification of the stroke due to resonance, by adjusting the natural frequency of the mass/spring system to be close to that of the operating frequency. This assures that there will be sufficient power available to operate the feeder with a reasonably sized electromagnetic. A typical maximum stroke value for feeders, of the above mentioned type, operating between 50 and 60 Hz. is between approximately 0.0625 inches and approximately 0.144 inches. Generally the lower the frequency the greater the possible maximum value of the stroke. A more detailed discussion of stroke angle and stroke magnitude is discussed in connection with Patterson et al., U.S. Pat. No. 5,967,294, entitled "High Stroke, Highly Damped Spring System for Use with Vibratory Feeders, the disclosure of which is incorporated herein by reference.

As the vibratory drive is actuated, and the trough is accelerated, the material resting on the surface of the trough is accelerated with the trough. As the trough reaches its maximum point of deflection, the trough begins to slow down and move back. If the material located in the trough has been accelerated sufficiently for the material to take flight, the material will continue to move forward as the trough reaches its maximum deflection, changes direction and moves back toward its rest position. Eventually, the material will fall back toward the surface of the trough, generally displaced at some distance forward from where the material originally took flight. During subsequent applied vibrations, the material is progressively moved even further forward. In this way, the material located in the trough can be conveyed in the desired direction by the vibratory feeder.

Generally, the magnitude and the frequency of the vibrational force applied to the trough is controlled by the characteristics of the power signal supplied to the vibratory drive of the vibratory feeder. In current vibratory feeders the power signal supplied to the vibratory feeder is generally controlled by an external controller. The external controller generates a conditioned power signal having the specific magnitude and frequency necessary to convey the material located in the trough at the desired rate and in the appropriate direction. The conditioned power signal is then conveyed over power lines specific to the corresponding vibratory feeder. Often times the external controller has one or more controls for adjusting the characteristics of the power that is supplied to the vibratory feeder.

Individual control of the specific power characteristics supplied to each vibratory conveyor is important, because each vibratory feeder will have its own unique material conveyance characteristics including its own resonant frequency. The material conveyance characteristics will vary between different vibratory feeders, due to inherent differences, which can result from known tolerances during their manufacture and/or dissimilar wear during their subsequent use. Where multiple vibratory feeders are used within the same system for a particular process it will likely be necessary to separately adjust each of the individual vibratory feeders in order to correctly manage material flow. As a result, each feeder will have a different power requirement, regardless of whether or not the material conveyance rates are the same or different for the different vibratory feeders. Consequently, prior systems have traditionally run separate power lines to each vibratory feeder, even where the multiple vibratory feeders are controlled through a common external controller.

As noted previously, vibratory feeders are commonly used in controlling the bulk delivery of product. One such noted example includes the use of vibratory feeders in product packaging. In many such instances multiple vibratory feeders are needed to provide accurate weights and corresponding processing rates demanded by the packaging process. Often times the multiple vibratory feeders are aligned either linearly or peripherally about a processing head for access by a packaging machine. Because each vibratory feeder has its own power requirements, each vibratory feeder will have its own corresponding power lines. Unfortunately, the physical routing requirements for running separate wiring for each vibratory feeder in a system where multiple vibratory feeders are used can be quite burdensome. Furthermore, because the power signals being supplied to vibratory feeders generally have a signal amplitude of a hundred volts or more, electrical cross-talk and interference between different sets of power control lines can be a problem, especially where the vibratory feeders and the separate corresponding sets of power lines are located proximate to one another.

Consequently, it would be desirable to provide a vibratory feeder, which is capable of locally providing for any required power adjustments, thereby enabling multiple vibratory feeders to receive power from a shared set of power lines.

These and other objects, features, and advantages of this invention are evident from the following description of a preferred embodiment of this invention, with reference to the accompanying drawings.

SUMMARY OF THE INVENTION

The present invention provides for a vibratory conveyor which includes a base and a trough. The vibratory driver is mounted to said base and is operatively connected to the trough to impart vibrations thereto. An integrated power control circuit is connected to the vibratory drive and a common supply bus for generating a locally adjusted drive signal. the locally adjusted drive signal is then supplied to the vibratory drive. In a preferred embodiment the power control circuit includes an output rate adjustment, which controls at least one of a frequency and an amplitude of the adjusted drive signal.

By incorporating a power control circuit as part of each vibratory conveyor, the one or more vibratory conveyors can receive power from a common or shared set of power lines. Any required adjustment of the power signal is provided locally by the power control circuit integrated as part of the vibratory conveyor. In this way it is no longer necessary to run separate power signals along separate power lines to each vibratory conveyor. The specific power adjustment (i.e. power shaping) for each vibratory conveyor is performed locally. This allows for specific power adjustments to similarly follow the vibratory conveyor, if the vibratory conveyor is subsequently moved. As a result initial setup or subsequent reconfiguration of the vibratory conveyors can be accomplished without requiring the routing or reconfiguration of separate power lines.

To the extent that it may be desirable to continue to route specific control signals to a vibratory conveyor, this can be accomplished using control signals having lower and safer voltage levels. Furthermore the signals could be digitally encoded and/or superimposed upon the power signals being routed along the common supply bus.

Other features and advantages of the present invention will be apparent from the following detailed description, the accompanying drawings, and the appended claims.

DETAILED DESCRIPTION OF THE PREFERRED EMBODIMENTS

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Figure 1:
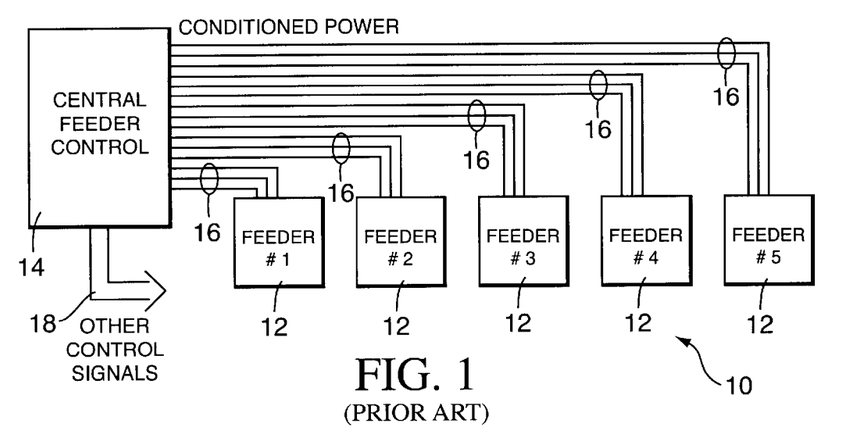
FIG. 1 is a schematic wiring diagram for a prior art system including multiple vibratory feeders including separate power supply lines for each vibratory feeder.

FIG. 1 illustrates a schematic wiring diagram for a prior art system 10 including multiple vibratory feeders 12, where separate power supply lines are provided for each of the vibratory feeders. In addition to the multiple vibratory feeders 12, the system includes a central feeder control 14. The central feeder control 14 provides power to each of the individual feeders 12. In the prior art system 10, a separate set of power signals meeting the specific power requirements for each of the vibratory feeders 12 is produced in the central feeder control 14. The separate power signals are then relayed to the corresponding vibratory feeders 12 via separate sets of power lines 16. Generally, the central feeder control 14 controls the amplitude and/or the frequency of the power signal produced for each of the vibratory feeders 12. In this way the rate at which the material is conveyed by the vibratory feeders 12 is controlled. Typically, each vibratory feeder 12 will have unique power requirements, due to planned or intended differences in the rates at which the vibratory feeders 12 will convey material, as well as unplanned inherent differences in the specific contruction of each of the vibratory feeders 12. In addition to supplying power to each of the vibratory feeders 12, the central feeder control 14 potentially transmits and/or receives additional control signals 18 for monitoring system status or controlling various functions throughout the system.

As noted previously, routing separate power lines 16 to each vibratory feeder 12 can be very time consuming and burdensome, especially when the system 10 is initially set up, or if the system is ever reconfigured. Furthermore, the separate power lines, which carry relatively high voltage power signals, have the added disadvantage of producing unwanted cross-talk and interference with respect to one another, thereby potentially negatively affecting their individual performance.

Figure 2:
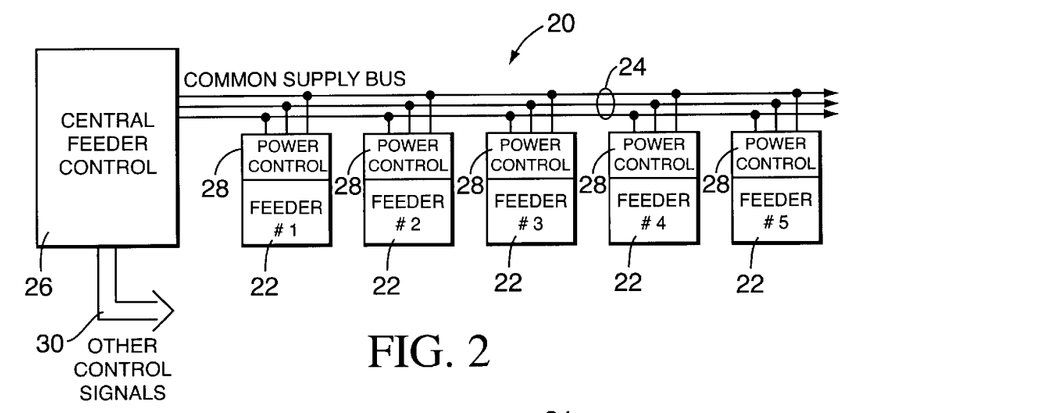
FIG. 2 is a schematic wiring diagram for a system including multiple vibratory feeders, in accordance with the present invention.

FIG. 2 illustrates a schematic wiring diagram for a system 20 including multiple vibratory feeders 22, in accordance with the present invention. Whereas the prior art system 10, illustrated in FIG. 1, provides separate power lines for carrying separately conditioned supply power to each of the vibratory feeders 12, the present system 20 provides for a shared common supply bus 24, which can be supplied by the central feeder control 26 or can be supplied directly from the main central utility power line, and which can be shared by one or more vibratory feeders 22. The separate power requirements for each of the vibratory feeders 22 is produced by separate power control circuits 28, which are integrated as part of the vibratory feeders 22. The power control circuits 28 locally provide for separate power conditioning including adjustments to amplitude and/or frequency for producing and maintaining the desired material throughput. By incorporating a power control circuit in each of the vibratory feeders 22, not only is the wiring of power lines greatly simplified but any power adjustments specific to a particular vibratory feeder 22 will be incorporated as part of the specific vibratory feeder 22. If a particular vibratory feeder 22 is subsequently moved, the adjustments specific to the feeder 22 are moved with it. Similar to the prior art system 10 of FIG. 1, system 20 as illustrated in FIG. 2 is also capable of receiving and/or transmitting other control signals 30. While the exemplary system is shown having five vibratory feeders 22, one skilled in the art will readily recognize that the use of any number of vibratory feeders 22 is possible without departing from the teachings of the present invention.

Figure 3:
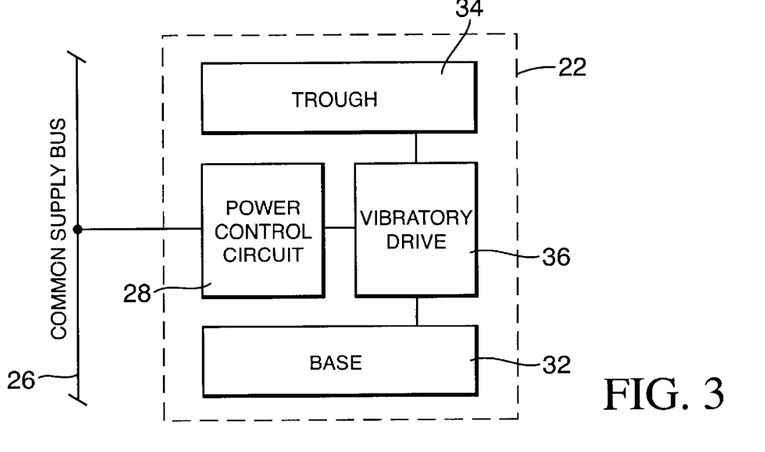
FIG. 3 is a block diagram of a vibratory feeder for use in the system shown in FIG. 2.

FIG. 3 illustrates an example of a block diagram for a vibratory feeders 22 for use in the system 20 shown in FIG. 2. The vibratory feeder 22 includes a base 32 and a trough 34. The trough 34 is generally a pan like structure, which conveys material received therein. The trough 34 is coupled to the base 32 via a vibratory drive 36, which vibrates the trough 34 with respect to the base 32. The vibratory drive 36 is coupled to a shared common supply bus 26 via a power control circuit 28, which receives power for driving the vibratory drive 36. The power control circuit 28 provides for any specific power conditioning including any adjustments to amplitude and/or frequency required for conveying material at the appropriate rate.

Figure 4:
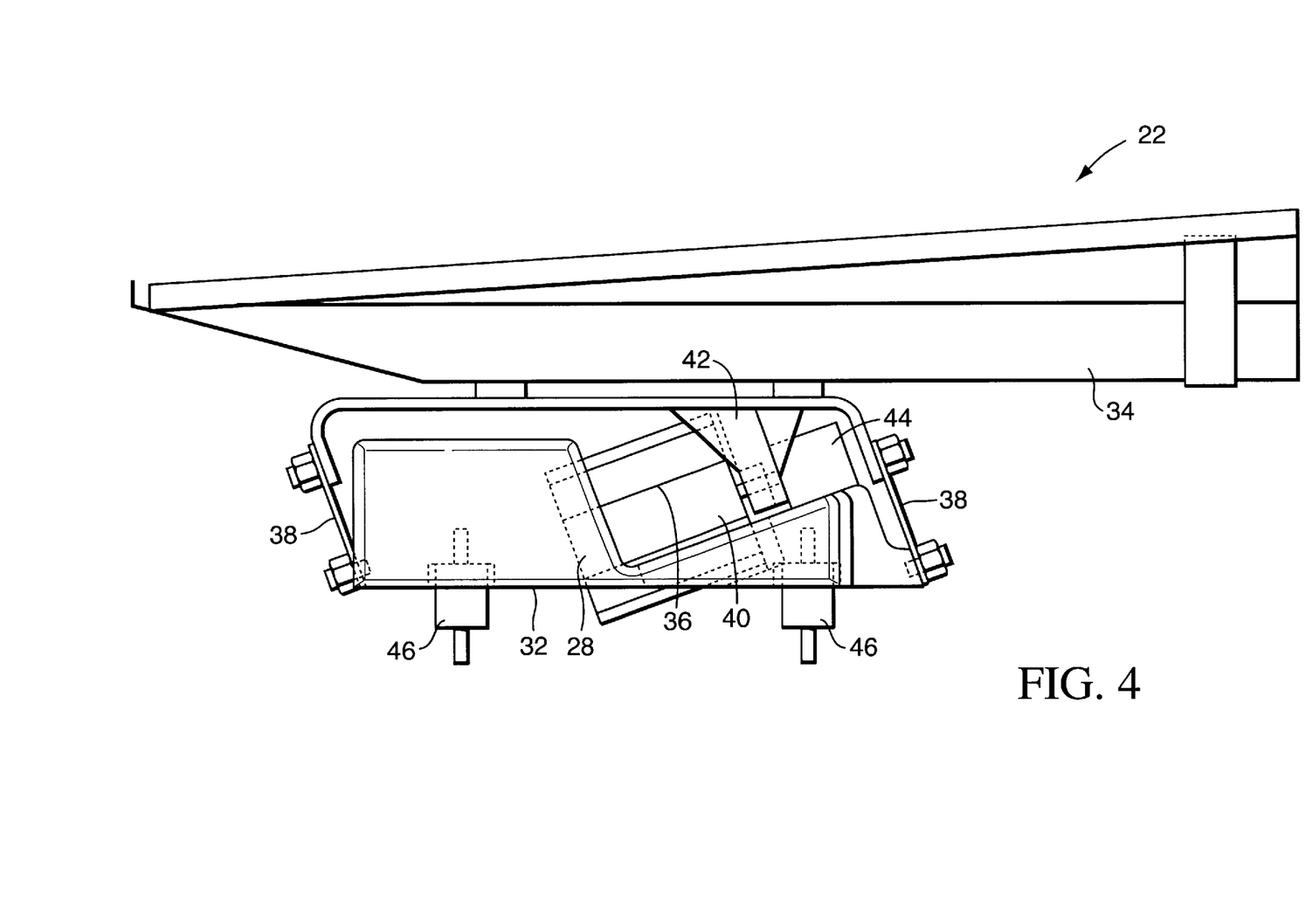
FIG. 4 is a side view of one example of a vibratory feeder in accordance with the block diagram shown in FIG. 3.

FIG. 4 illustrates a side view of one example of a vibratory feeder 22, which embodies the present invention. The vibratory feeder 22 includes a base 32 and a trough 34. The trough 34 is generally located above the base 32 and is coupled to the base 32 via a pair of springs 38. In the illustrated embodiment, the springs 38 are mounted at an angle, with at least one spring being located in the front and one or more additional springs being located in the back. The angle of the springs 38 define, at least in part, the direction of movement of the trough and correspondingly the material located in the trough including the amount of vertical movement and the amount of horizontal movement as the trough 34 moves with respect to the base 32.

The movement of the trough 34 with respect to the base 32 is effected by a vibratory drive 36, which is mounted to the base 32, and is operatively coupled to the trough 34. In the illustrated embodiment, the motion is achieved through an electromagnetic attraction. The vibratory drive 36 includes an electromagnetic core and coil 40, which is coupled to the base 32, and an armature 42, which is coupled to the trough 34. As power is supplied to the electromagnetic core and coil 40 and current is caused to flow within the coil, a magnetic force is induced in the electromagnetic core and coil 40. The armature 42 is correspondingly attracted to the electromagnetic core and coil 40 by the magnetic force induced in the core and the coil 40. This causes the trough 34 to move with respect to the base 32 as well as any material located in the trough 34. As the trough 34 moves relative to the base 32, the springs 38 are caused to deflect resulting in energy being stored within the springs 38. When the current is removed, the electromagnetic force causing the trough 34 to be deflected disappears, and the energy stored within the springs is released. The trough 34 then reverses direction and begins to move back to its non-deflected position away from the base 32.

However, whereas the motion of the trough 34 is restricted by the springs, the material located in the trough 34 is not similarly restricted. As the trough begins to reach its maximum deflection point and begins to decelerate, the momentum of the material located in the trough 34 causes the material to separate from the trough 34 and continue to move forward for a short distance before the material eventually loses its momentum and falls back to the trough 34 having traveled a distance along the length of the trough 34. By repeating this relative motion between the base 32 and the trough 34, material located in the trough 34 can be moved progressively forward.

While the described embodiment provides for a vibratory drive 36 which includes an electromagnetic core and coil, and a corresponding armature, one skilled in the art will readily appreciate that alternative types of vibratory drives could alternatively be used, without departing from the intended scope of the present invention. Examples of alternative vibratory drives include vibratory drives, which use permanent magnets or linear actuators.

The magnitude and the frequency of the vibrations are controlled by the frequency and the amplitude of an AC power signal applied to the electromagnetic core and coil 40. In accordance with the present invention the AC power signal applied to the electromagnetic core and coil 40 is adjusted and controlled by a power control circuit 28 integrated as part of the vibratory feeder 22. In the preferred embodiment, the power control circuit 28 is potted within the end of the electromagnetic core and coil 40 (as shown in FIG. 4). Alternatively, the power control circuit 28 can be positioned in a cutout located in the base 32. Other locations for the power control circuit 28 within the vibratory feeder 22 are similarly possible.

Figure 5:
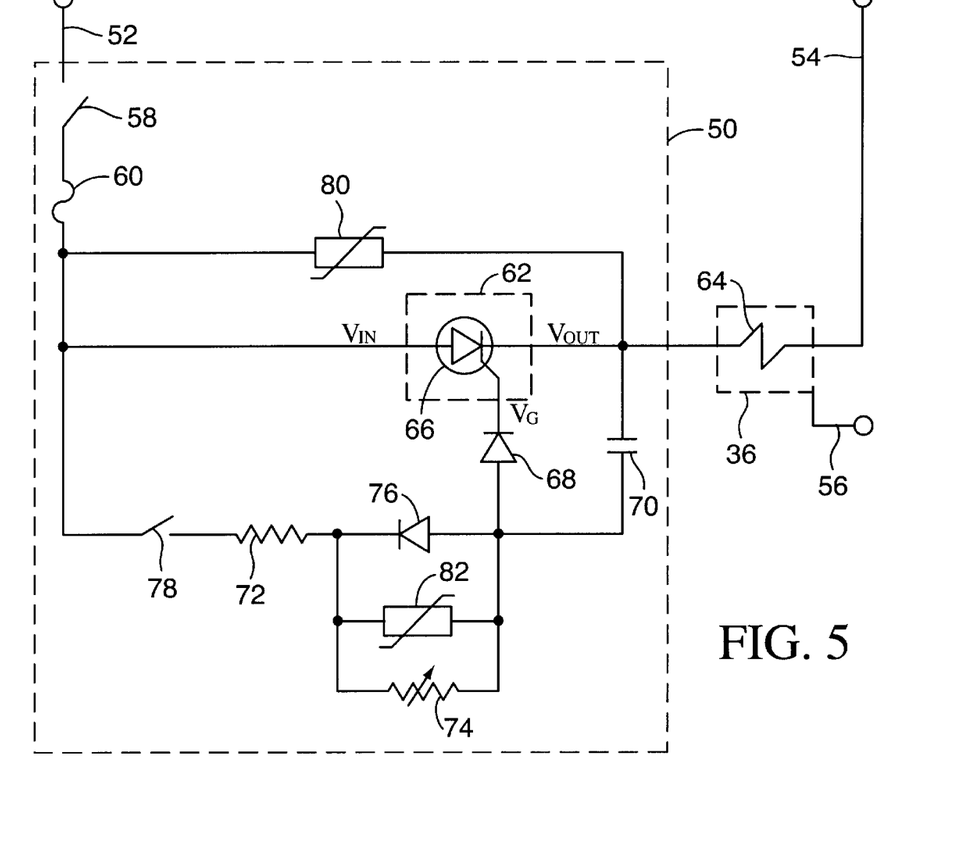
FIG. 5 is a circuit schematic of a power control circuit and a vibratory drive for use in the vibratory feeder shown in FIG. 3.

One example of a specific power control circuit 50 for locally adjusting a drive signal supplied to a vibratory drive 36 is illustrated in FIG. 5. In the illustrated example, circuit 50 is coupled to one of three power terminals corresponding to a shared common supply bus 26. The first power terminal 52 provides a supply voltage connection. The second power terminal 54 provides a neutral connection. The third power terminal 56 provides a signal ground connection.

The first power terminal 52 is coupled to a switch 58, which can be actuated for selectively supplying power to the vibratory feeder 22 and the corresponding power control circuit 50. The switch 58 is additionally coupled in series with a fuse 60, which prevents the current being supplied to the vibratory feeder 22 from exceeding a specified limit. The fuse in turn is coupled to a gating circuit 62, which selectively applies the supply voltage received via the first power terminal 52 to the coil of an electromagnet 64 of the vibratory drive 36. The other end of the coil of the electromagnet 64 is coupled to the neutral connection via the second power terminal 54. The third terminal 56 is coupled to the exposed metal case of the vibratory drive 36 as well as other portions of the vibratory feeder 22 having exposed metal, thereby generally providing for exposed metal surfaces which are grounded.

The gating circuit 62 includes a silicon controlled rectifier (SCR) 66, which once activated will conduct current so long as positive current is flowing through the SCR 66. When the current through the SCR 66 reaches zero or drops below zero, the SCR 66 will stop conducting and will no longer pass even positive current unless or until the SCR 66 is reactivated. The SCR 66 is activated by a voltage being applied to the gate of the SCR 66, which exceeds the turn-on threshold voltage of the SCR 66. The gate of the SCR 66 is coupled to the cathode of diode 68.

The timing for turning on the SCR 66 is affected by a capacitor 70 coupled between the anode of diode 68 and the cathode of SCR 66. Effectively, capacitor 70 limits the rate at which the gate voltage of SCR 66 can be charged up to the threshold voltage, after a positive voltage from the first power terminal 52 is first applied. The rate is further limited by a pair of resistances 72 and 74, which are coupled in series between the first power terminal 52 and the gate of the SCR 66.

The first resistance is a resistor 72 having a predetermined fixed resistance, which effectively limits the maximum charge rate, and correspondingly the minimum turn-on delay of the SCR 66. The second resistance is a potentiometer 74 having a variable resistance, whose value can be adjusted to further affect the charge rate, and the corresponding time for the SCR 66 to turn on. By altering the charge rate and the turn-on time of the gating circuit 62, the amplitude of the power signal and the magnitude of the current supplied to the vibratory drive 36 can be adjusted. Further details are provided in connection with the subsequent discussion of FIGS. 6A–6C.

The power control circuit 50 further includes a diode 76 coupled in parallel with the potentiometer 74, which enables the charge stored in capacitor 70 to bypass potentiometer 74 and discharge through diode 76, during the negative half cycles of the supply voltage received via the first power terminal 52. The power control circuit further includes a switch 78 coupled in series between the resistor 72 and fuse 60. The switch 78 enables the gating circuit 62 to be separately disabled by preventing the charging of the gate voltage of the SCR 66 without removing power from the rest of the vibratory feeder 22.

The power circuit 50 additionally includes a pair of varistors 80 and 82, which provide overvoltage protection. The first varistor 80 is coupled in parallel with the gating circuit 62. The second varistor 82 is coupled in parallel with diode 76 and potentiometer 74.

Figure 6A:
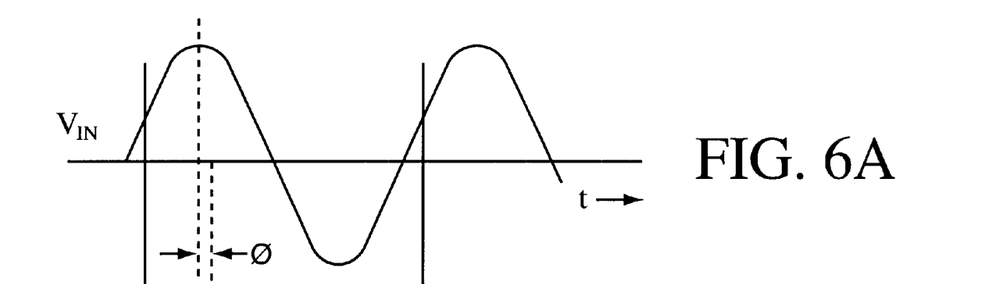
FIGS. 6A–6C are examples of voltage waveforms which are produced within the power control circuit shown in FIG. 5.
Figure 6B:
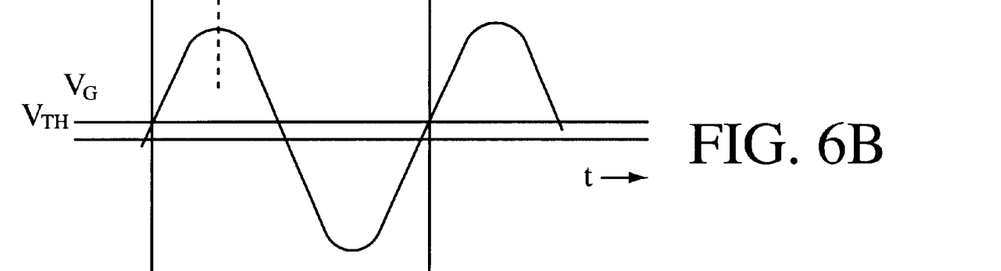

FIGS. 6A–6C illustrate various signals received or generated in connection with the power control circuit 50 illustrated in FIG. 5. FIG. 6A illustrates a waveform of voltage versus time of the supply voltage provided by the first power terminal 52 at the input Vin of the gating circuit 62. The supply voltage supplied across the series combination of resistances 72 and 74, and capacitor 70 produces a voltage Vg at the gate of SCR 66, represented by the waveform illustrated in FIG. 6B. The waveform Vg is a sinusoidal signal, similar to the supply voltage Vin. More specifically waveform Vg has a frequency that is equivalent to the frequency of Vin. The waveform Vg has a phase difference θ, which lags behind the phase of Vin. The specific phase difference is largely dependent upon the component values of resistances 72 and 74, and capacitor 70. The SCR 66 will begin to conduct, when the voltage of waveform Vg exceeds the turn-on threshold voltage Vth for the SCR 66.

Figure 6C:
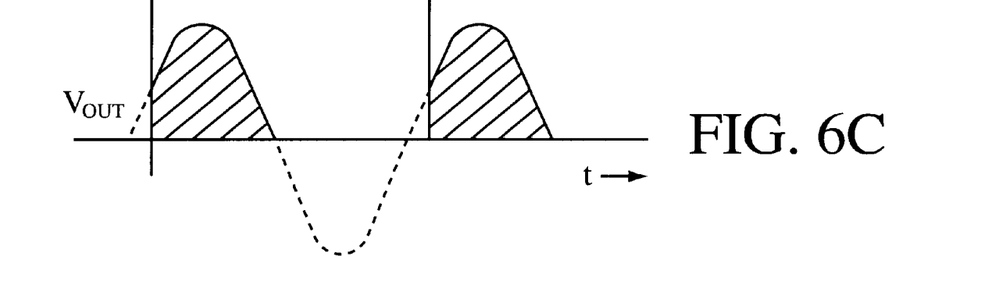

FIG. 6C represents the voltage waveform Vout which is seen at the output of the SCR 66. When the SCR 66 is conducting the voltage waveform Vout is nearly equivalent to the voltage waveform of the supply voltage Vin seen at the first power terminal 52. Regardless of the gate voltage being applied to SCR 66, when the voltage across the SCR 66 falls below zero or becomes negative the SCR 66 will shut off and/or stop conducting. Because of the delay associated with turning on the SCR 66, an adjustable portion of the first part of the input signal Vin is not correspondingly reproduced at the output Vout of the gating circuit 62.

By altering the values of capacitor 70 or resistances 72, 74 the delay before the SCR is turned on can be shortened or lengthened. This will result in more or less of the the beginning portion of the positive half cycle of the voltage supplied by the first power terminal 52 being clipped or not being transmitted by the gating circuit 62. In this way the magnitude of the power signal supplied to the vibratory drive 36 can be correspondingly adjusted.

While the power control circuit 50, illustrated in FIG. 5, represents one example of a suitable circuit for locally adjusting the power supplied to the vibratory drive 36, other circuits which similarly adjust signal amplitude could also be used. Alternatively, circuits which adjust frequency, or both frequency and amplitude could similarly be used.

Figure 7:
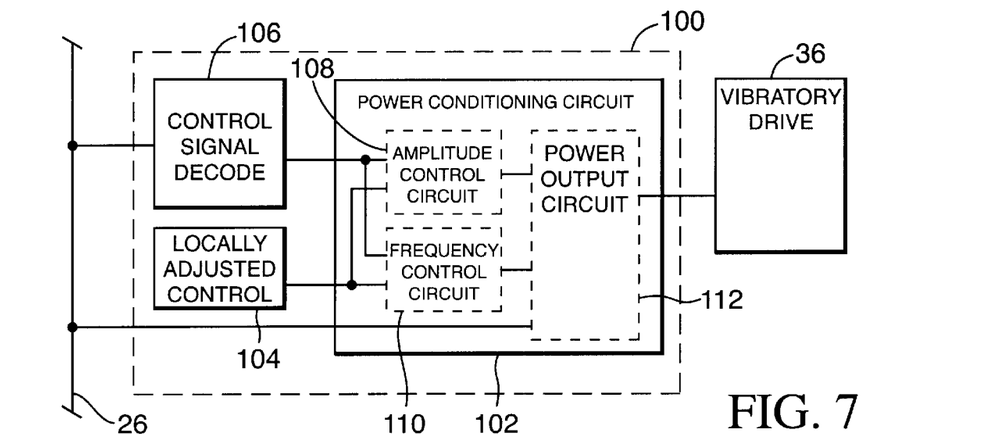
FIG. 7 is a block diagram of an alternative power control circuit and vibratory drive for use in the vibratory feeder shown in FIG. 3.

FIG. 7 illustrates an alternative embodiment of a power control circuit 100, which provides for adjustment of both amplitude and frequency of a received power signal. In addition to providing for a locally adjusted control, the power control circuit is also capable of receiving additional control signals via the shared common supply bus or alternatively via separately wired control signals. More specifically, FIG. 7 provides for a power control circuit 100, which includes a power conditioning circuit 102 that is coupled to the shared common supply bus 26.

In addition to providing a locally adjusted control 104, which is analogous to the potentiometer 74 provided for in the power control circuit 50 illustrated in FIG. 5, the power control circuit 100 provides for a control signal decode circuit 106 coupled to the shared common supply bus 26 for decoding control signals received from either a central source (i.e. the central feeder control 26) or a distributed source (i.e. other vibratory feeders 22).

In at least one embodiment the control signals received from the central feeder control 26 are digitally encoded, and can be received by all of the vibratory feeders 22 coupled to the shared common supply bus 26. Each control signal is encoded with an address or an identifying sequence, which identifies which vibratory feeder 22 is to receive the corresponding control signals. The digitally encoded signals are generally superimposed upon the general power supply voltage using a carrier frequency that does not interfere with the power signal, and which can be readily discerned from the power supply voltage.

The power conditioning circuit 102 includes both an amplitude control circuit 108 and a frequency control circuit 110. In this way both the amplitude and the frequency of the power signal supplied to the vibratory drive 36 can be adjusted. Both the amplitude control circuit 108 and the frequency control circuit 110 can each be coupled to the control signal decode circuit 106 and/or the locally adjusted control 104 for receiving control signals for receiving the adjustments to be made to either the amplitude and/or the frequency of the power signal, if any.

In at least one embodiment, the amplitude control circuit 108 includes a variable gain amplifier, and the frequency control 110 circuit includes a variable frequency oscillator. In a further embodiment the variable frequency oscillator includes a digital-to-analog convertor coupled to a microcontroller, which is adapted for generating an output signal having the desired frequency. The power conditioning circuit 102 further includes a power output circuit 112, which electrically isolates the amplitude control circuit 108 and the frequency control circuit 110 from the vibratory drive 36, and also produces a conditioned power output signal having a sufficient power level for driving the vibratory drive 36.

From the foregoing, it will be observed that numerous modifications and variations can be effected without departing from the true spirit and scope of the novel concept of the present invention. It is to be understood that no limitation with respect to the specific embodiments disclosed herein is intended or should be inferred. The disclosure is intended to cover by the appended claims all such modifications as fall within the scope of the claims.

What is claimed is:

1. A vibratory conveyor system comprising A plurality of vibratory conveyors each including:
   a base;
   a trough;
   a vibratory drive mounted to said base and operatively coupled to said trough to impart vibrations thereto; and
   a power control circuit integrated within and as part of the vibratory conveyor system, coupled to each of the vibratory drives and a common supply bus for generating a locally adjusted drive signal and supplying the drive signal to the vibratory drives.

2. A vibratory conveyor in accordance with claim 1 wherein said power control circuit includes an output rate adjustment, which controls at least one of a frequency and a magnitude of the drive signal supplied to the vibratory drive.

3. A vibratory conveyor in accordance with claim 1 wherein the vibratory drive includes at least one element from a list including a permanent magnet, an electromagnet and a linear actuator.

4. A vibratory conveyor in accordance with claim 1 wherein the power control circuit includes a gating circuit for selectively coupling an input power signal received via the common supply bus to the vibratory drive thereby generating the drive signal.

5. A vibratory conveyor in accordance with claim 4 wherein the gating circuit is a silicon controlled rectifier.

6. A vibratory conveyor in accordance with claim 4 wherein the power control circuit includes a firing control circuit coupled to the gating circuit for controlling the activation of the gating circuit.

7. A vibratory conveyor in accordance with claim 6 wherein the firing control circuit includes a resistance in combination with a capacitance for variably delaying the activation of the gating circuit.

8. A vibratory conveyor in accordance with claim 1 wherein the power control circuit includes a signal generator for producing the drive signal.

9. A vibratory conveyor in accordance with claim 8 wherein said power circuit includes one or more output rate adjustment control signals coupled to said signal generator, which controls at least one of a frequency or a magnitude of the drive signal supplied to the vibratory drive.

10. A vibratory conveyor in accordance with claim 9 wherein the output rate adjustment control signals includes a frequency control signal for selecting one of a plurality of drive signal frequencies, and a magnitude control signal for selecting one of a plurality of drive signal magnitudes.

11. A vibratory conveyor in accordance with claim 9 wherein at least one of the output rate adjustment control signals includes one or more digitally encoded control signals.

12. A vibratory conveyor comprising:
    a base;
    a trough;
    a vibratory drive mounted to said base and operatively coupled to said trough to impart vibrations thereto; and
    a power control circuit integrated within the vibratory conveyor, coupled to the vibratory drive and a common supply bus for generating a locally adjusted drive signal and supplying the drive signal to the vibratory drive, said power control circuit including
      a gating circuit for selectively coupling an input power signal received via the common supply bus to the vibratory drive thereby generating the drive signal, and
      a firing control circuit coupled to the gating circuit for controlling the activation of the gating circuit, said firing control circuit including a resistance in combination with a capacitance for variably delaying the activation of the gating circuit, wherein the resistance includes a variable resistor for adjusting the delay.

13. A vibratory conveyor in accordance with claim 12 wherein the variable resistor is a potentiometer.

14. A vibratory conveyor comprising:
    a base;
    a trough;
    a vibratory drive mounted to said base and operatively coupled to said trough to impart vibrations thereto; and
    a power control circuit integrated within the vibratory conveyor, coupled to the vibratory drive and a common supply bus for generating a locally adjusted drive signal and supplying the drive signal to the vibratory drive, said power control circuit including
      a signal generator for producing the drive signal, and
      one or more output rate adjustment control signals coupled to said signal generator, which controls at least one of a frequency or a magnitude of the drive signal supplied to the vibratory drive, said output rate adjustment control signals including a frequency control signal for selecting one of a plurality of drive signal frequencies, and a magnitude control signal for selecting one of a plurality of drive signal magnitudes,
    wherein the signal generator includes a variable frequency oscillator coupled to the frequency control signal, and a variable gain amplifier coupled to the variable frequency oscillator and the magnitude control signal.

15. A vibratory conveyor in accordance with claim 14 wherein the variable frequency oscillator is a digital to analog convertor coupled to a microcontroller.

16. A vibratory conveyor comprising:

a base;

a trough;

a vibratory drive mounted to said base and operatively coupled to said trough to impart vibrations thereto; and a power control circuit integrated within the vibratory conveyor, coupled to the vibratory drive and a common supply bus for generating a locally adjusted drive signal and supplying the drive signal to the vibratory drive, said power control circuit including a signal generator for producing the drive signal, and one or more output rate adjustment control signals coupled to said signal generator, which controls at least one of a frequency or a magnitude of the drive signal supplied to the vibratory drive, wherein at least one of the output rate adjustment control signals is a low voltage analog signal.

17. A vibratory conveyor in accordance with claim 16 wherein the low voltage analog signal is received via one or more separate control lines.

18. A vibratory conveyor in accordance with claim 16 wherein the low voltage analog signal is a low voltage DC signal.

19. A vibratory conveyor comprising:

a base;

a trough;

a vibratory drive mounted to said base and operatively coupled to said trough to impart vibrations thereto; and a power control circuit integrated within the vibratory conveyor, coupled to the vibratory drive and a common supply bus for generating a locally adjusted drive signal and supplying the drive signal to the vibratory drive, said power control circuit including a signal generator for producing the drive signal, and one or more output rate adjustment control signals coupled to said signal generator, which controls at least one of a frequency or a magnitude of the drive signal supplied to the vibratory drive, wherein at least one of the output rate adjustment control signals includes one or more digitally encoded control signals, which are received via the common supply bus.

20. A system for conveying one or more materials comprising:

a central feeder control;

a common supply bus; and a plurality of vibratory conveyors, each vibratory conveyor including a base, a trough, a vibratory drive mounted to said base and operatively coupled to said trough to impart vibrations thereto, and an integrated power control circuit coupled, as part of the respective vibratory conveyor, to the corresponding vibratory drive and the common supply bus for generating a locally adjusted drive signal and supplying the drive signal to the vibratory drives.

* * * * *